(12) United States Patent
Kaplan Haelion

(10) Patent No.: US 10,397,196 B2
(45) Date of Patent: Aug. 27, 2019

(54) PORT-SCRAMBLING-BASED NETWORKS

(71) Applicant: CYBER 2.0 (2015) LTD., Yavne (IL)

(72) Inventor: Erez Kaplan Haelion, Rehovot (IL)

(73) Assignee: CYBER 2.0 (2015) LTD., Yavne (IL)

( * ) Notice: Subject to any disclaimer, the term of this patent is extended or adjusted under 35 U.S.C. 154(b) by 185 days.

(21) Appl. No.: 15/445,930

(22) Filed: Feb. 28, 2017

(65) Prior Publication Data

US 2018/0248851 A1 Aug. 30, 2018

(51) Int. Cl.
| | |
|---|---|
| H04L 29/06 | (2006.01) |
| H04L 29/12 | (2006.01) |
| H04L 9/06 | (2006.01) |
| H04L 12/24 | (2006.01) |
| H04L 12/26 | (2006.01) |
| H04L 29/08 | (2006.01) |

(52) U.S. Cl.
CPC ........ H04L 63/0428 (2013.01); H04L 9/0625 (2013.01); H04L 9/0631 (2013.01); H04L 43/062 (2013.01); H04L 61/2015 (2013.01); H04L 63/0823 (2013.01); H04L 63/1441 (2013.01); *H04L 67/02* (2013.01)

(58) Field of Classification Search
CPC ... H04L 63/0428; H04L 63/00; H04L 9/0631; H04L 9/0625; H04L 63/0823; H04L 61/2015; H04L 63/1441; H04L 63/1433; H04L 41/046; H04L 63/06; H04L 67/02; H04L 29/06; H04L 9/06; H04L 29/12; H04L 12/24
USPC ......................................... 713/168, 162, 170
See application file for complete search history.

(56) References Cited

U.S. PATENT DOCUMENTS

| | | | |
|---|---|---|---|
| 5,903,721 A | 5/1999 | Sixtus | |
| 6,549,538 B1 | 4/2003 | Beck | |
| 6,775,290 B1 * | 8/2004 | Merchant | ............ H04L 12/4645 370/395.31 |
| 9,419,942 B1 * | 8/2016 | Buruganahalli | .... H04L 63/0227 |
| 2002/0002674 A1 * | 1/2002 | Grimes | ................... G06F 21/10 713/156 |

(Continued)

FOREIGN PATENT DOCUMENTS

EP 2 640 008 A2 9/2013

*Primary Examiner* — Ashokkumar B Patel
*Assistant Examiner* — Quazi Farooqui
(74) *Attorney, Agent, or Firm* — Birch, Stewart, Kolasch & Birch, LLP

(57) ABSTRACT

A device, method and product for port-scrambling-based networks. The method comprising in response to a device intending to transmit an outgoing communication to a target device in a computer network, via a first port, scrambling the first port of the outgoing communication to obtain a second port by applying a transformation function which utilizes a certificate that is shared among a portion of the devices in the computer network; and transmitting the outgoing communication to via the second target port. The method comprises receiving, via a second source port, an incoming communication from a source device in the computer network, descrambling the second source port of the incoming communication to obtain a first source port by applying a reverse function of the transformation function; and directing the incoming communication at the first source port instead of the second source port.

20 Claims, 5 Drawing Sheets

(56) References Cited

U.S. PATENT DOCUMENTS

| | | |
|---|---|---|
| 2005/0114663 A1* | 5/2005 | Cornell .................. G06F 21/57 |
| | | 713/168 |
| 2005/0125692 A1 | 6/2005 | Cox et al. |
| 2005/0220017 A1 | 10/2005 | Brand |
| 2006/0005227 A1 | 1/2006 | Samuelsson |
| 2010/0142562 A1* | 6/2010 | Ito ....................... G06F 13/4291 |
| | | 370/503 |
| 2011/0122880 A1 | 5/2011 | Saito |
| 2013/0058341 A1 | 3/2013 | Fulton |
| 2013/0212687 A1 | 8/2013 | Smith |
| 2015/0181054 A1* | 6/2015 | Hayakawa ......... H04N 1/00244 |
| | | 358/1.15 |
| 2016/0359915 A1 | 12/2016 | Gupta et al. |

\* cited by examiner

PORT-SCRAMBLING-BASED NETWORKS

TECHNICAL FIELD

The present disclosure relates to computer networks in general, and to selective port scrambling for network communications, in particular.

BACKGROUND

Computer networks are prevalent among many enterprises and organizations to facilitate communication and resource-sharing among a wide range of users. As an example, computer networks may be used to facilitate communication via email, video conferencing, instant messaging, or the like; to enable multiple users to share a single hardware device like a printer, scanner, or the like; to enable file sharing across the network, allow for the sharing of software or operating programs on remote systems, make information easier to access and maintain among network users, or the like.

A virtual network is a computer network that consists, at least in part, of virtual network connections between two or more computing devices. A virtual network may be implemented using methods of network virtualization, such as protocol-based virtual networks (e.g. Virtual Local Area Networks (VLANs) and Virtual Private Networks (VPNs)), based on virtual devices (such as the networks connecting virtual machines inside a hypervisor), a conjunction thereof, or the like.

One form of virtual network may be VLAN. VLANs are logical local area networks that perform based on physical LANs. A VLAN can be created by partitioning a physical LAN into multiple logical LANs using a VLAN ID. Alternatively, several physical LANs can function as a single logical LAN. The partitioned network can be on a single router, or multiple VLANs can be on multiple routers just as multiple physical LANs would be. The VLAN requires a dedicated device for managing the VLAN itself and complex configurations thereof.

BRIEF SUMMARY

One exemplary embodiment of the disclosed subject matter is a device having a processor and a memory, wherein said device operating within a computer network comprising a plurality of devices, wherein said memory retaining a certificate, wherein the certificate is shared among a portion of the plurality of devices, wherein said device comprising: a communication module for sending and receiving transmissions to and from devices in the computer network; a transformation module configured to apply a transformation function on an identifier of a first port to obtain an identifier of a second port, wherein the transformation function depends on the certificate; a reverse transformation module configured to apply a reverse transformation function on the identifier of a fourth port to obtain an identifier of a third port, wherein the reverse transformation function depends on the certificate and is a reverse function of the transformation function; an outgoing agent configured to obtain outgoing communications, wherein said outgoing agent is configured to invoke said transformation module on an identifier of target port of an outgoing communication to obtain an identifier of a second target port, wherein said outgoing agent is further configured to provide a modified outgoing communication to said communication module for being transmitted to a target device via the second target port, whereby if the target device is a member of the portion of the plurality of devices, the target device is enabled to perform reverse transformation on the identifier of the second target port to obtain the identifier of the target port of the outgoing communication; and an incoming agent configured to obtain incoming communications received by said communication module, wherein said incoming agent is configured to invoke said reverse transformation module on an identifier of a second source port of an incoming communication, wherein the incoming communication was transmitted by a source device, whereby an identifier of a first source port is obtained, wherein said incoming agent is further configured to output a modified incoming communication, wherein the modified incoming communication is directed at the first source port instead of the second source port, whereby if the source device is not a member of the portion of the plurality of devices, said device is unable to correctly process the incoming communication.

Another exemplary embodiment of the disclosed subject matter is a computer-implemented method performed by a device operating within a computer network, wherein the computer network comprising a plurality of devices, wherein a certificate is shared among a portion of the plurality of devices, wherein said computer-implemented method comprising: in response to the device intending to transmit an outgoing communication to a target device in the computer network, via a first port: scrambling the first port of the outgoing communication to obtain a second port, wherein said scrambling comprises applying a transformation function on an identifier of the first target port to obtain an identifier of the second target port, wherein the transformation function utilizes the certificate; and transmitting the outgoing communication to the target device via the second target port, whereby if the target device is a member of the portion of the plurality of devices, the target device is enabled to perform a reverse transformation on the identifier of the second target port to obtain the identifier of the first target port of the outgoing communication; and in response to the device receiving, via a second source port, an incoming communication from a source device in the computer network: descrambling the second source port of the incoming communication to obtain a first source port, wherein said descrambling comprises applying a reverse transformation function on an identifier of the second source port of the incoming communication to obtain an identifier of the first source port, wherein the reverse transformation function utilizes the certificate and is a reverse function of the transformation function; and directing the incoming communication at the first source port instead of the second source port, whereby if the source device is not a member of the portion of the plurality of devices, the device is unable to correctly process the incoming communication.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
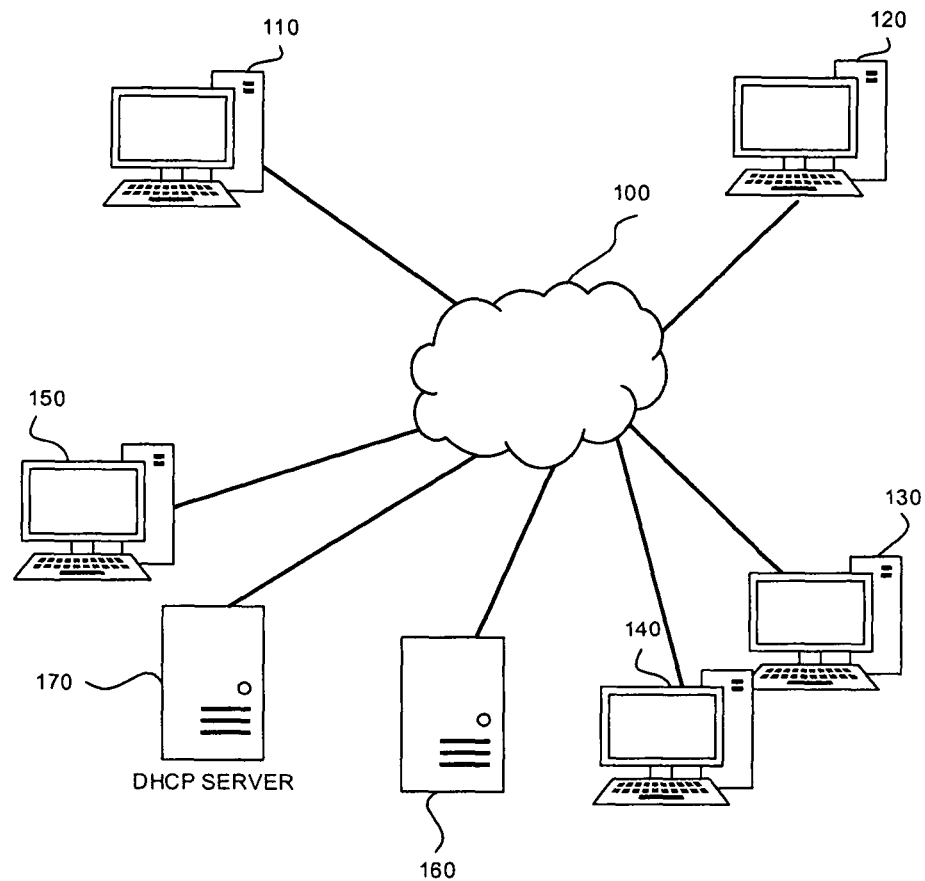
FIGS. 1A and 1B show computerized environments in which the disclosed subject matter is used, in accordance with some exemplary embodiments of the subject matter.

One technical problem dealt with by the disclosed subject matter is to provide for communication within a sub-network of a computer network. In some exemplary embodiments, a portion of devices of the plurality of devices comprised by the computer network may desire to communicate as a sub-network. In some exemplary embodiments, it may be desired to communicate within the sub-network without allowing a third party to listen in. For that, the portion of devices may be required to communicate in a way not susceptible to eavesdropping or interception.

Another technical problem dealt with by the disclosed subject matter is to prevent spreading of malicious code within a computer network.

In some exemplary embodiments, computer network may comprise a plurality of computerized devices interconnected to one another and sharing resources, such as, for example, through common access to one or more servers connected to the computer network. In many cases, some or even all of the devices in the computer network may be simultaneously connected also to one or more external networks, such as the World Wide Web. As a result, any of the devices in the computer network may be made much more susceptible to various security threats and attacks, in particular the proliferation of self-propagating malicious codes. Once a device in the computer network becomes compromised, the infection may be spread quickly to the remaining devices, causing potentially irreparable harm.

Yet another technical problem is to allow for the creation of ad-hoc sub-networks. The creation of the sub-network may be desired to be possible without requiring complex configurations. Additionally or alternatively, the sub-network may be dynamically updated by adding or removing computers thereof, migrating computers from one sub-network to another, or the like. In some exemplary embodiments, the creation of a sub-network similar to VLAN without requiring complex configurations may be desired. However, VLAN may prevent the computer to communicate with a computer outside the VLAN, while such a constraint may be undesirable.

One technical solution is to scramble port identifiers towards which outgoing communications are directed at the transmitting end and descramble port numbers at the receiving ends in which the incoming communications are received.

A "port" is a logical construct associated with a service or process residing on a computing platform and serves as an endpoint for different types of network communication. In some exemplary embodiments, a port is identified for each host address and communication protocol by a 16-bit number, thus a port number ranges from 0 to 65535. Generally, port numbers appear in network packets and map to specific processes or resources on the destination device that can handle or are expecting those packets. Some resources are preconfigured to listen to only certain predefined port numbers and ignore traffic associated with other ports. Typical network protocols that heavily rely on port numbers to map to resources include Transmission Control Protocol (TCP) and User Datagram Protocol (UDP). Some port numbers or port number ranges may be reserved for standard services, such as the "well-known ports" ranging from 0 to 1023 used by TCP and UDP. For example, services running the Hypertext Transfer Protocol (HTTP) protocol typically listen on port 80.

In some exemplary embodiments, a certificate may be shared among the portion of devices of the sub-network. The scrambling and the descrambling may be performed correctly only by devices sharing the certificate. The certificate may preferably include a time-varying component to decrease likelihood of an attacker obtaining and reusing a certificate. In some exemplary embodiments, the time-varying component may be distributed by a server maintaining the sub-network or by another leader device. Additionally or alternatively, the certificate may be a static encryption key.

In some exemplary embodiments, the certificate may be generated based on user-provided credentials, such as a password. As a result, the certificate may be shared among different devices without the need to distribute the certificate over the network.

In some exemplary embodiments, the scrambling may be performed by applying a transformation function on an identifier of the port of an outgoing communication planned to be transmitted, to obtain an identifier of a scrambled port. The transformation function may depend on the certificate. On the other hand, the descrambling may be performed by applying a reverse transformation function on an identifier of the port of an incoming communication, to obtain an identifier of a descrambled port. The reverse transformation function may also depend on the certificate and may be a reverse function of the transformation function used for the scrambling. The device may transmit outgoing communications via the scrambled ports instead of the original ports and process incoming communications as if received via the descrambled ports instead of the original ports.

In case that a communication is transmitted from a source device to a destination device both sharing the same certificate, the source device may scramble the identifier of the original port towards which the communication is transmitted using the transformation function associated with the certificate; and transmit the communication via the scrambled port. While the destination source may descramble the identifier of the scrambled port at which the communication is received using the respective reverse transformation function, to obtain the original port and process the communication as if received via the original port. Accordingly, the source device and the destination device may be enable to correctly communicate.

In case that one of the source device or the destination device is not a member of the portion of devices desiring to securely communicate, and don not retain the certificate; the communication may not be correctly processed as it may be transmitted and/or processed via a scrambled port.

In some exemplary embodiments, scrambling and descrambling may be performed in a selective manner.

In some exemplary embodiments, the scrambling and the descrambling may not be performed on server communications. For example, communications to and from a Dynamic Host Configuration Protocol (DHCP) server may not be scrambled, so as to allow the DHCP server to manage the Internet Protocol (IP) addresses of computers both included in and excluded from the sub-network. As another example, a communication to and from an email server may not be scrambled, thereby allowing the sub-network devices to correctly communicate with the email server which is outside the sub-network, and serves computers that are both in and out of the sub-network.

Additionally or alternatively, the scrambling and the descrambling may not be performed for communications associated with approved application programs. Approved application programs may be configured to communicate with other devices outside the sub-network. For example, the approved application programs may be an Internet browser, an email client program, or the like. By avoiding scrambling, the applications are enabled to communicate correctly with devices outside the sub-network, such as a web server and an email server. In some exemplary embodiments, the determination whether or not to scramble the communication may be based directly on the identity of the issuing or receiving application and whether such application is an approved application program. Additionally or alternatively, the scrambling decision may be based indirectly on the identity of such applications, such as based on the relevant port in which the communication is received or through which the communication is transmitted.

In some exemplary embodiments, two devices that do not share the same certificate may be allowed to communicate nonetheless. In some exemplary embodiments, the communication therebetween may be performed without scrambling and descrambling the ports. Each of the two devices may retain the Internet Protocol (IP) address of the other device, and transmit or process communications associated with the IP address without scrambling or descrambling their ports. Additionally or alternatively, the two device may retain a second certificate indicating such a direct communication. The two device may transmit and process communication therebetween by respectively scrambling and descrambling the ports of the communications using the second certificate as a basis for the port scrambling and descrambling.

One technical effect of utilizing the disclosed subject matter is to provide for a relatively efficient manner of creating a sub-network that has properties similar to a VLAN but does not share its disadvantages. In some exemplary embodiments, the sub-network in accordance with the disclosed subject matter is created ad-hoc without the need of any IT professional and potentially based on relatively simple configurations. Additionally or alternatively, the sub-network may be of devices in a same LAN or connected to different LANs which are connected to one another (e.g., via a WAN, via the Internet).

Another technical effect may be to provide for a selective port scrambling that allows a computer to continue functioning correctly in a network in which only a portion of the devices employ port scrambling.

Yet another technical effect may be enabling a single DHCP server to manage IP addresses of a network, where the network comprises portions of two or more sub-networks, each of which is based on a different port scrambling (e.g., port scrambling based on different certificates). Similarly, other servers are enabled to continue functioning correctly with respect to different sub-networks, and potentially with respect to devices that do not invoke any port scrambling.

Yet another technical effect may be to enable the use of port-scrambling without a central server and without distribution over the network of the shared certificate. As a result, the certificate may be less prone to be compromised.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1A showing a computerized environment in which the disclosed subject matter is used, in accordance with some exemplary embodiments of the subject matter.

In some exemplary embodiments, a plurality of devices may be connected via a Computer Network 100, such as Devices 110-150. Computer Network 100 may comprise one or more servers, such as Server 160 and DHCP Server 170. Computer Network 100 may be a telecommunications network which allows Devices 110-150 and Servers 160-170 to share resources. Devices 110-150 and Servers 160-170 may exchange data with each other using data links. The connections between Devices 110-150 and Servers 160-170 may be established using either a wired connection, a wireless connection, or combination thereof. In some exemplary embodiments, Computer Network 100 may be an intranet network of an organization. Computer Network 100 may be connected to an external network, such as the Internet (not shown). In some cases, Computer Network 100 may be connected to the external network by a router, switch, server or a similar network device. In some exemplary embodiments, the network device may be configured to provide some security measures to prevent malicious activity. In some exemplary embodiments, the network device may provide a functionality of a firewall monitoring incoming and outgoing communications in and from Computer Network 100. Computer Network 100 may support different protocols, applications and services. In some exemplary embodiments, Computer Network 100 may enable sharing of resources between devices connected thereto, such as a shared storage space, a shared printer, or the like.

In some exemplary embodiments, Devices 110-150 may be computerized devices such as personal computers, smartphones, servers, networking hardware or the like. Two such devices may be networked together when one device is able to exchange information with the other device, whether or not they have a direct connection to each other.

In some exemplary embodiments, a portion of Devices 110-150 and Servers 160-170 connected via Computer Network 100 may communicate as a sub-network, such as for example, Device 110, Device 120, Device 140 and Server 160. Devices of the sub-network may be configured to scramble and descramble communication ports. Each Device of the portion of devices may retain a certificate that is shared among all the members of the sub-network.

In some exemplary embodiments, the certificate may be a number. The certificate may be a number represented by a number of bits that is larger than a predetermined threshold, such as a 128-bit number, 256-bit number, 1024-bit number. As will be apparent to a person of ordinary skill in the art, the larger the number of bits used for the certificate, the less likely that a malicious entity will be able to independently obtain it based on observed communications in Computer Network 100.

In some exemplary embodiments, the certificate may comprise a static encryption key. The static encryption key may be a fixed key that uniquely identifies the sub-network. In some exemplary embodiments, the fixed key may identify the organization in which the computerized environment operates in addition to or instead of the identification of the sub-network. Additionally or alternatively, the certificate may comprise a time-dependent encryption key. The time-dependent encryption key may be valid for a limited time duration. In some exemplary embodiments, the time-dependent encryption key may be replaced routinely, such as periodically. In some exemplary embodiments, the certificate may comprise a combination of keys, such as a time dependent key that is updated periodically, and a fixed key that is constant.

In some exemplary embodiments, the certificate may be distributed to the portion of devices by Server 160. Additionally or alternatively, a device in the sub-network that is deemed as a leader device may be responsible to distribution of the certificate. In some exemplary embodiments, the leader device may be selected using a quorum-based protocol. Additionally or alternatively, a group of two or more devices may operate in conjunction to distribute the certificate in the sub-network. Additionally or alternatively, the certificate may be obtained based on credentials provided by a user (not shown) of each device. In some exemplary embodiments, based on credential provides by the user, the certificate may be retrieved from a remote storage. Additionally or alternatively, the certificate may be generated based on the credentials. For example, a password provided by the user may be fed into a hash function, such as MD5, to generate the certificate. In some exemplary embodiments, the hash value generated based on the credentials may be used in conjunction with a static key, such as by concatenating the bits of the hash value and the bits of the static key, by performing a mathematical operation on the static key and the hash value (e.g., multiplying the hash value by the static key), or the like.

In some exemplary embodiments, the certificate may be used as part of a transformation function associated with the sub-network. In some exemplary embodiments, the transformation function may be a function receiving two parameters: a certificate to be used for the transformation and a value to perform the certificate-based transformation. Additionally or alternatively, the transformation function may be hard-coded to utilize the certificate and if the certificate is modified, a different function may be used instead thereof. Each device in the sub-network may apply the transformation function on identifiers of ports of outgoing communications of the device to obtain transformed ports. The device may transmit its outgoing communications via the transformed ports. Each device in the sub-network may apply a reverse function of the transformation function on identifiers of ports of incoming communications of the device to obtain transformed ports. The device may process its incoming communications as if received via the transformed ports. When transmitting an outgoing communication via a transformed port, in case the target device is a member of the sub-network, the target device may be enabled to perform reverse transformation on an identifier of the transformed port to obtain the identifier of the original port of the outgoing communication, and process it correctly. In case the target device is not a member of the sub-network, the target device may not process the outgoing communication in the correct, original port. In some exemplary embodiments, if a device of the sub-network obtains an incoming communication from a source device which is not a member of the sub-network, the device may not be able to correctly process the incoming communication, as it may attempt to descramble the port using the reverse transformation function, although the port may not be scrambled or may be scrambled using a different certificate.

It will be noted that the transformation function and the reverse transformation function may be used interchangeably. The transformation function is, in fact, a reverse function of the reverse transformation function.

As a non-limiting example, consider the sub-network comprising Devices 110, 120 and 140. Devices 110, 120 and 140 may each retain the shared certificate. Other devices such as Device 130 and Device 150, may not retain the shared certificate. It may be noted that Device 130 and Device 150 may, in some embodiments, be members of another sub-network and accordingly may retain another shared certificate. Assuming, for example, the Device 110 intends to transmit an outgoing communication via port 1562 to a Device 120. Prior to the transmission, Device 110 may scramble port 1562 using the transformation function (that is based on the shared certificate) to obtained a scrambled port number. For example, the scrambled port number may be 2503. Device 110 may transmit the outgoing communication to the target device via the scrambled port (i.e., port 2503). Device 120 may obtain the outgoing communication as an incoming communication which is received in the scrambled port (port 2503). Prior to processing the payload of the incoming communication, Device 120 may apply the reverse transformation function to obtain a descrambled port. As the reverse transformation function of Device 120 is based on the same certificate that the transformation function of Device 110 is based on, the descrambled port will be the original port (port 1562). As a result, Device 120 may correctly process the incoming communication via the original port, as was originally intended.

Consider that Device 110 instead transmits the outgoing communication to Device 130 who is not a member of the sub-network. Device 130 may be incapable of correctly descrambling the scrambled port. In some exemplary embodiments, Device 130 may attempt processing the communication in the scrambled port (port 2503). Additionally or alternatively, Device 130 may attempt to descramble the scrambled port. However, as the descrambling may be based on a function that uses a different certificate than the certificate used by Device 110, the descrambled port may be a different port than the original port (for the sake of example, port 3999).

Similarly, in response to receiving an incoming communication, Device 110 may descramble the port of the incoming communication. The descrambling may be performed by applying the reverse transformation function that is based on the certificate, on an identifier of the port of the incoming communication to obtain an identifier of a descrambled port. Device 110 may process the incoming communication as if received via the reversed port. The payload of the incoming communication may be processed correctly if the descrambled port is the original port, such as if Device 120 had transmitted the incoming communication after scrambling its port using the transformation function that is based on the certificate. Additionally or alternatively, the payload may be processed incorrectly if the port was not scrambled or if the port was scrambled using a different certificate-based transformation function.

In some exemplary embodiments, server communications, such as DHCP communications transmitted to or received by DHCP Server 170, communications to and from email servers, communications to and from web servers, or the like, may be excluded from the above mentioned process. The server may be configured to communicate with different devices of potentially different sub-networks and/or devices not comprised by any sub-network. For example, DHCP Server 170 may be configured to manage IP addresses of computing devices of Computer Network 100. In order to preserve such functionality without having a dedicated DHCP Server 170 for the sub-network, devices of the sub-network, such as Device 110, may be configured to transmit server outgoing communications without applying the transformation function on identifiers of ports thereof. Additionally or alternatively, devices of the sub-network, such as Device 110, may be configured to process incoming server communications without applying the reverse transformation on identifiers of ports of the incoming server communications. In some exemplary embodiments, Device 110 may be configured to identify server communications based on their port identifiers. As an example, DHCP communications may be transmitted and received via User Datagram Protocol (UDP) ports. Device 110 may be configured to identify that an outgoing communication is a DHCP communication based on the UDP port number of the destination port being a port number of a server, i.e. 67; and that an incoming communication is a DHCP communication based on the UDP port number of the source port being a port number of a server, i.e. 68. Additionally or alternatively, Device 110 may be configured to identify server communication based on adherence of their payload to a predetermined protocol. For example, the payload may be examined to identify network configuration parameters, addresses, structure, headers, or the like.

In some exemplary embodiments, a device belonging to the sub-network, such as Device 110, may communicate with a device excluded from the portion of devices, such as Device 150, despite not belonging to the same sub-network. Device 110 may be configured to determine communication directed to and from Device 150, based on being addressed to and from the IP address of Device 150. Device 110 may transmit communications to Device 150 without applying the transformation function on identifiers of their ports; and to process incoming communications without applying reverse transformation function on identifiers of their ports. Additionally or alternatively, communications between Device 110 and Device 150 may be performed using scrambling and descrambling of ports based on a second certificate that is shared between Device 110 and Device 150.

In some exemplary embodiments, Device 110 may retain a blacklist of programs, allowing transmissions without encoding using the transformation of the ports. The device may transmit outgoing communications of program comprised by the blacklist, without applying the transformation function on identifiers of their port. In case, the destination device of the not a member of the portion of devices, the destination device may be enabled to correctly process the outgoing communications of the program as transmitted and received via the original ports. Non-limiting examples of programs in the blacklist may be Internet browsers, e-mail clients, or the like. In some exemplary embodiments, the blacklist may comprise programs that are configured to communicate with servers outside the sub-network, such as a third-party servers, servers serving devices from different sub-networks, or the like. Additionally or alternatively, other programs may be listed in the blacklist, such as based on manual identification of administrators, based on automatic rules, or the like.

In some exemplary embodiments, Device 130 and Device 150 may form a second sub-network within Computer Network 100. Device 130 and Device 150 may retain a second certificate. A second transformation function and a second reverse transformation function depending on the second certificate may be utilized by Device 130 and Device 150 to privately communicate by transforming ports of outgoing communications and reversely transforming ports of incoming communications. Devices 110, 120, and 150 may be unable to correctly process communications from Device 130 and Device 150, if ports thereof are scrambled using the second transformation function.

In some exemplary embodiments, the certificate retained by Device 110 may be replaced with the second certificate that is associated with the second sub-network. Accordingly, Device 110 may be logically migrated from the sub-network to the second sub-network. In some exemplary embodiments, Device 110 may be able to correctly communicate with devices of the second sub-network and no longer be able to correctly communicate with the devices of the sub-network.

In some exemplary embodiments, Server 160 may send Device 110 the second certificate. The decision to migrate Device 110 may be automatic based on rules or configurations. Additionally or alternatively, the decision to migrate Device 110 may be made by an administrator or by a user of Device 110. In some exemplary embodiments, Server 160 may update configurations of Device 110 based on the configurations of the second sub-network, such as update the blacklist. Additionally or alternatively, Server 160 may update exception rules for Device 110, such as delete a previously existing exception rule regarding communication with Device 130 (e.g., previously a device that was not a member of the same sub-network as Device 110 and which is a member of Device 110's current sub-network).

Additionally or alternatively, Device 110 may obtain the second certificate from another source different than Server 160. For example, a user of Device 110 may provide credentials associated with the second sub-network, such as a shared password that is shared by the users of the devices of the second sub-network.

In some exemplary embodiments, similarly to Devices 100-150, Server 160 may comprise Processor(s) (not shown), I/O Module (not shown) and Memory (not shown). Server 160 may be configured to generate and distribute certificates among a plurality of computing devices in Computer Network 100. Additionally or alternatively, Server 160 may be configured to generate and distribute the time-dependent key in a periodic manner, such as every one hour, every ten minutes, or the like. In some exemplary embodiments, Server 160 may be configured to maintain and updating blacklist of programs of Device 150 or other devices in Computer Network 100.

Figure 1B:
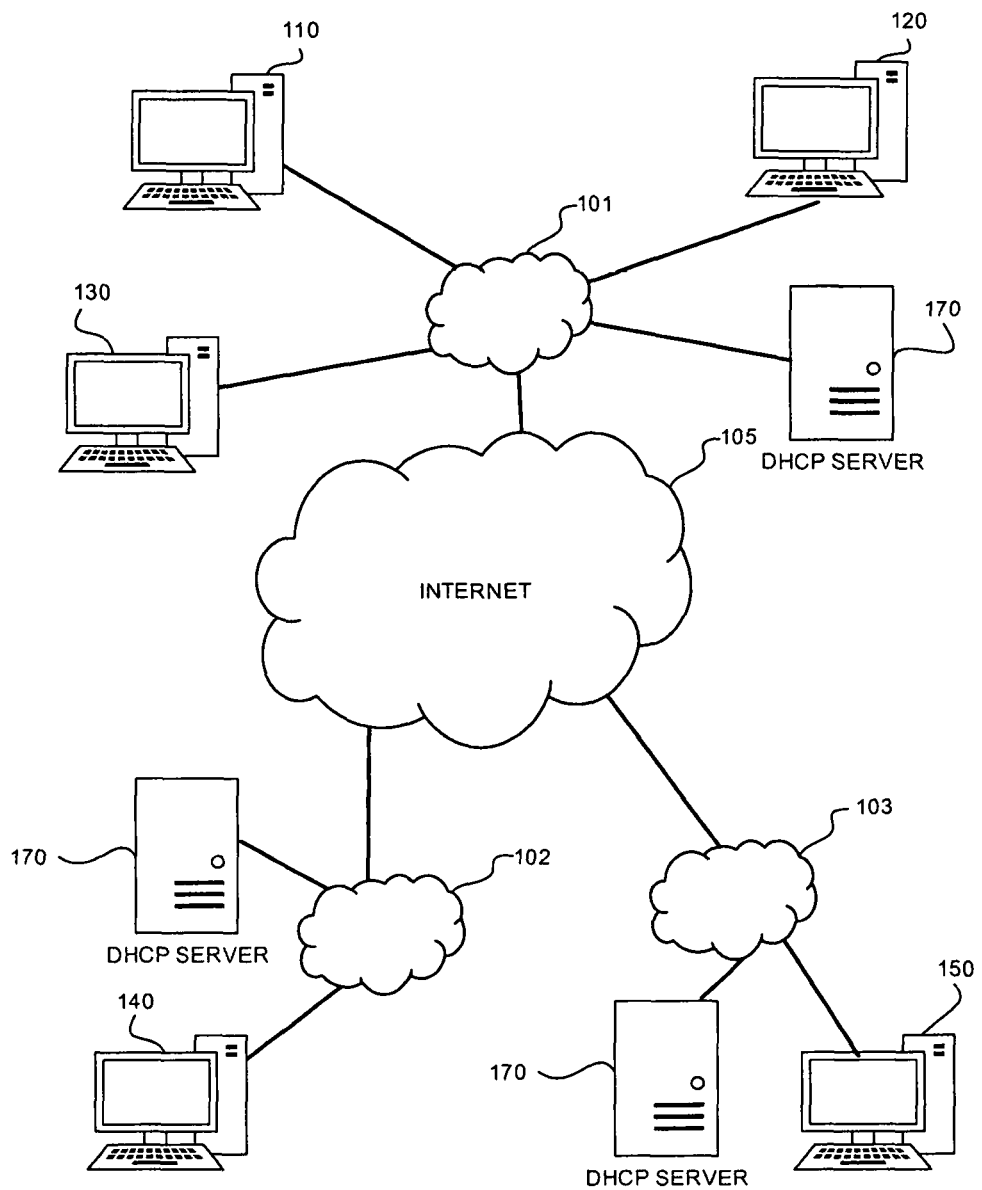

Referring now to FIG. 1B showing a computerized environment in which the disclosed subject matter is used, in accordance with some exemplary embodiments of the subject matter.

In some exemplary embodiments, each device may be directly connected to one of Computer Networks 101-103. Computer Networks 101-103 may be characterized by its physical capacity or its organizational purpose. Use of each computer network, including user authorization and access rights, may differ accordingly. Computer Networks 101-103 may be Personal Area Networks (PAN), Local Area Networks (LAN), Wide Area Networks (WAN), Home Area Networks (HAN), Storage Area Networks (SAN), Campus Area Networks (CAN), Metropolitan Area Network (MAN), Virtual Private Network (VPN), Global Area Network (GAN), or the like.

In some exemplary embodiments, Computer Networks 101-103 may be connected via the Internet 105. Internet 105 may be a global system of interconnected computer networks such as Computer Networks 101-103. Internet 105 may be based on the networking technologies of the Internet Protocol suite. Internet 105 may connect between Devices 110-150 and DHCP Servers 170 connected to different Computer Networks 101-103 via a common routing technology using routers.

In some exemplary embodiments, Devices 110-150 may be interconnected to one another via the aggregation of computer networks. In some exemplary embodiments, Devices 110-150 may be connected to one another via a WAN that is composed of several LANs, such as Computer Networks 101, 102, 103. Each LAN may be managed separately, such as by a different administrator, using a different DHCP server 170, or the like.

In some exemplary embodiments, Devices 110, 120 and 140, which are not directly connected to the same computer network, may be function as a sub-network. Devices 110, 120 and 140 may communicate therebetween by scrambling and descrambling ports of their communication.

In some exemplary embodiments, the sub-network may be maintained by a cloud-based server (not shown) with which all devices may communicate. The cloud-based server may be configured to distribute the shared certificates and other configuration files, update the certificates and configuration files, or the like. In some exemplary embodiments, a user of Device 110 attempting to connect to a sub-network, may access a web portal. The user may provide her credentials in the web portal. The cloud-based server may verify the credentials to determine whether the user is authorized. In case the user is authorized, the cloud-based server may transmit the certificate to Device 110.

Additionally or alternatively, connecting to the sub-network may maintained in a distributed manner without having a centric server. The user of Device 110 may provide her credentials. The credentials may be transformed, such as using a hash function, into a certificate having a static key. The generated certificate may be used in the communications of Device 110, thereby effectively allowing Device 110 to communicate correctly with all other devices whose users provided the same credentials.

Figure 2:
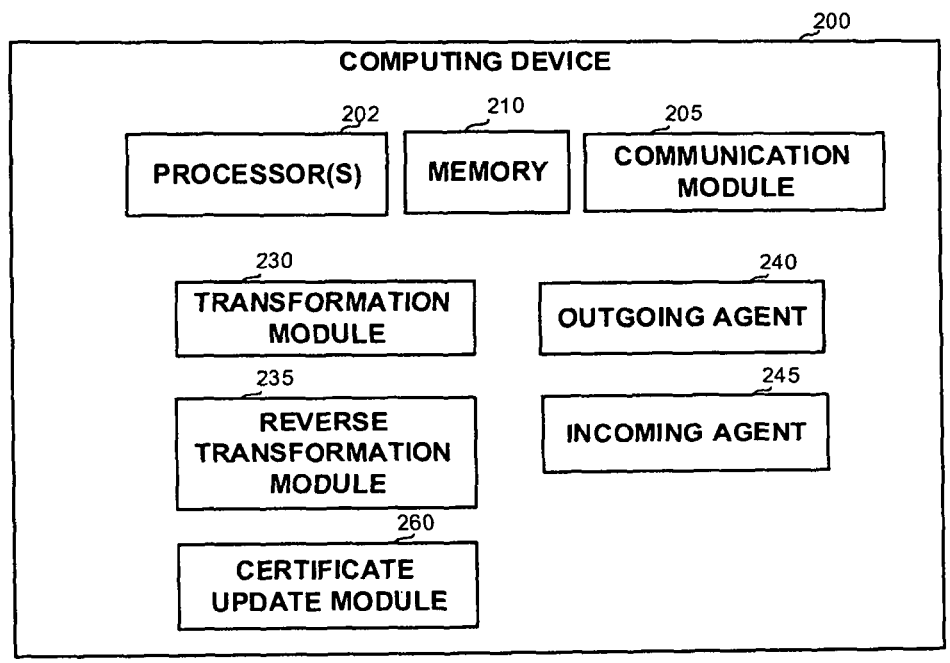
FIG. 2 shows a block diagram of a computing device, in accordance with some exemplary embodiments of the disclosed subject matter.

Referring now to FIG. 2 showing a computing device in accordance with some exemplary embodiments of the disclosed subject matter.

A Computing Device 200, such as Device 110 of FIG. 1A, may be configured to operate within a computer network, such as Computer Network 100 of FIG. 1A.

In some exemplary embodiments, Computing Device 200 may be operated by a user (not shown). Computing Device 200 may provide an output to and receive input from the user, such as, for example, receiving credentials, updating configuration files, adding or removing exception rules, adding programs to black lists, or the like.

In some exemplary embodiments, Computing Device 200 may comprise one or more Processor 202. Processor 202 may be a Central Processing Unit (CPU), a microprocessor, an electronic circuit, an Integrated Circuit (IC) or the like. Processor 202 may be utilized to perform computations required Computing Device 200 or any of it subcomponents.

In some exemplary embodiments, Computing Device 200 may comprise a Communication Module 205. Computing Device 200 may utilize Communication Module 205 as an interface to transmit and/or receive information and instructions between Computing Device 200 and external devices. In some exemplary embodiments, Communication Module 220 may be utilized by Computing Device 200 for sending and receiving transmissions to and from devices in the computer network.

In some exemplary embodiments, Computing Device 200 may comprise a Memory 210. Memory 210 may be a hard disk drive, a Flash disk, a Random Access Memory (RAM), a memory chip, or the like. In some exemplary embodiments, Memory 210 may retain program code operative to cause Processor 202 to perform acts associated with any of the subcomponents of Computing Device 200.

Memory 207 may comprise one or more components as detailed below, implemented as executables, libraries, static libraries, functions, or any other executable components.

In some exemplary embodiments, Memory 210 may retain a certificate. The certificate may be shared among a portion of the plurality of devices comprised by the computer network. In some exemplary embodiments, the certificate may be a static encryption key, a time-dependent encryption key, a combination of static and time-dependent keys, or the like.

In some exemplary embodiments, the certificate may be distributed to the portion of the plurality of devices by a server connected to the computer network, such as Server 160 in FIG. 1A or a cloud-based server. The server may distribute and synchronize time-dependent encryption keys used as the certificate, a part of the certificate, or the like.

Additionally or alternatively, the certificate may be generated based on credentials provided by a user of Computing Device 200, such as but not limited to a password provided by the user. In such a case, the certificate may not be distributed over the computer network, but rather privately generated at each end-point.

In some exemplary embodiments, Memory 210 may retain exception rules for Computing Device 200. The exception rules may define rules for determining when an outgoing communication or an incoming communication is not to be scrambled or descrambled, respectively. The exception rules may include a blacklist of programs, whose outgoing communications are not to be scrambled. It will be noted that the blacklisted programs may or may not be actually installed on Computing Device 200 or may not be executed by Device 200 at any time. The exception rules may include protocols, ports, patterns of payloads, which indicate a communication that is not to be scrambled/descrambled, such as relating to DHCP, Simple Mail Transfer Protocol (SMTP), HyperText Transformation Protocol (HTTP), Internet Message Access Protocol (IMAP), Web Calendar Access Protocol (WCAP), or the like. The exception rules may include IP addresses of devices which are handled in a different manner, either by avoiding scrambling/descrambling, or by scrambling/descrambling using a different certificate.

In some exemplary embodiments, Computing Device 200 may comprise a Transformation Module 230. Transformation Module 230 may be configured to apply a transformation function on identifiers of ports associated with outgoing communications to obtain identifiers of scrambled ports. In some exemplary embodiments, the transformation function may depend on the certificate. Additionally or alternatively, Transformation Module 230 may use the certificate as a parameter of the transformation function. The transformation function may be a symmetric cryptography function, such as Data Encryption Standard (DES), Advanced Encryption Standard (AES), Blowfish, or the like.

In some exemplary embodiments, Computing Device 200 may comprise a Reverse Transformation Module 235. Reverse Transformation Module 235 may be configured to apply a reverse transformation function on identifiers of ports of incoming communication of Computing Device 200, to obtain identifiers of descrambled ports. In some exemplary embodiments, the reverse transformation may be a reverse function of the transformation function. The reverse transformation function may depends on the certificate, may use the certificate as a parameter, or the like.

In some exemplary embodiments, Computing Device 200 may comprise an Outgoing Agent 240. Outgoing Agent 240 may be configured to obtain outgoing communications from programs of Computing Device 200. Outgoing Agent 240 may be configured to selectively invoke Transformation Module 230 on an identifier of a target port of an outgoing communication to obtain an identifier of a second target port. Outgoing Agent 240 may be configured to provide a modified outgoing communication to Communication Module 220 for being transmitted to a target device via the second target port. In case the target device is a member of a sub-network, the target device may be enabled to utilize her Incoming Agent 245 to perform reverse transformation on the identifier of the second target port to obtain the identifier of the target port of the outgoing communication.

In some exemplary embodiments, Outgoing Agent 240 may be configured to monitor outgoing server communications. Outgoing Agent 240 may be configured to provide a server outgoing communication to Communication Module 220 to transmit the server outgoing communication, without invoking Transformation Module 230. In some exemplary embodiments, Outgoing Agent 240 may be configured to identify the server outgoing communication based on a port identifier of the server outgoing communication. In some applications, Computing Device 200 and the server each may use specific port numbers assigned by the Internet Assigned Numbers Authority (IANA).

As an example, one type of server communications may be communication to and from the Internet mail system, which is a server used for sending and receiving emails. Computing Device may transport email to and from the server with the SMTP. By default, the SMTP service application may listen on TCP port 25 for incoming requests. Additionally or alternatively, Computing Device may transport emails to and from the server using the Post Office Protocol (POP) which is used by e-mail clients to fetch email messages from the server. By default, the POP service may listen on TCP port number 110.

Further, Outgoing Agent 240 may be configured to identify the server outgoing communication based on adherence of a payload of the server outgoing communication to a predetermined protocol.

In some exemplary embodiments, the server outgoing communication may be a communication directed at a DHCP server. DHCP may be a standardized network protocol used on IP networks. DHCP may be controlled by a DHCP server that dynamically distributes network configuration parameters, such as IP addresses, for interfaces and services. The DHCP server may enable devices to request IP addresses and networking parameters automatically, reducing the need for a network administrator or a user to configure these settings manually. The DHCP server may be capable of managing the IP addresses in the computer network. The DHCP server may be capable of assigning a first IP address to Computing Device 220 and a second IP address to a second device which does not retain the certificate. Outgoing Agent 240 may be configured to identify communications directed to DHCP server, based on the specific port numbers assigned by the IANA to DHCP, in which the Computing Device 200 may use UDP port 68 and the DHCP server may use UDP port 67. Further, Outgoing Agent 240 may be configured to identify communications directed to DHCP server, based on adherence of a payload of the communications, such as requests for assigning IP addresses or the like.

In some exemplary embodiments, Outgoing Agent 240 may be configured to implement any exception rule retained in Memory 210, such as IP-based exception rules, protocol-based exception rules, or the like.

In some exemplary embodiments, Computing Device 200 may comprise an Incoming Agent 245 that is configured to obtain incoming communications received by Communication Module 220. Incoming Agent 245 may be configured to invoke Reverse Transformation Module 235 on an identifier of a second source port of an incoming communication, wherein the incoming communication was transmitted by a source device, whereby an identifier of a first source port may be obtained. Incoming Agent 245 may be configured to output a modified incoming communication directed at the first source port instead of the second source port. In case the source device is not a member of the portion of the plurality of devices, the device may not be able to correctly process the incoming communication.

In some exemplary embodiments, similarly to Outgoing Agent 240, Incoming Agent 245 may be configured to implement any exception rule retained in Memory 210. As an example, Incoming Agent 245 may be configured to process incoming server communication of Computing Device 200. Incoming Agent 245 may be configured to provide a server incoming communication, without invoking Reverse Transformation Module 235. In some exemplary embodiments, Incoming Agent 245 may be configured to identify the server incoming communication based on a port identifier of the server incoming communication. Further, Incoming Agent 245 may be configured to identify the server incoming communication based on adherence of a payload of the server incoming communication to a predetermined protocol.

In some exemplary embodiments, Outgoing Agent 240 and Incoming Agent 245 may be implemented as part of a driver of a hardware communication component of Computing Device 200. The driver may intercept and analyze any outgoing packet before its transmission. The driver may modify the outgoing packet, such as by changing the port number, and allow the hardware communication component to transmit the modified packet. Similarly, the driver may intercept and analyze any incoming packet before its processing by the target component of Computing Device 200. The driver may modify the incoming packet, such as by changing the port number, and provide the modified incoming packet for processing. In such an embodiment, Communication Module 205 may be implemented, at least in part, by the hardware communication component.

In some exemplary embodiments, Memory 210 may retain an IP address of a second device. The second device may operate within the computer network. The second device may not be a part of the portion of the plurality of devices that constitute the sub-network. Outgoing Agent 240 may be configured to determine that a second outgoing communication is directed to the second device, based on the second outgoing communication being addressed to the IP address. Outgoing Agent 240 may be configured to provide the second outgoing communication to Communication Module 220 for transmission, without invoking said Transformation Module 230, allowing a direct connection between Computing Device 220 and the second device, without being in the same sub-network. In some exemplary embodiments, Incoming Agent 245 may be configured to determine that a second incoming communication was transmitted by the device having the IP address. Incoming Agent 245 may be configured to process the second incoming communication without invoking Reverse Transformation Module 235.

In some exemplary embodiments, A Certificate Updating Module 260 may be configured to replace the certificate with a second certificate. The second certificate may be shared among a second portion of the plurality of devices. In response to Certificate Updating Module 260 updating the certificate, the transformation function of Transformation Module 230 and the reverse transformation function of Reverse Transformation Module 235, may be updated to utilize the second certificate for the transformation or reverse transformation, respectively. In such a case, Computing Device 200 may be enabled to communicate with devices comprised by the second portion of the plurality of devices using Transformation Module 230 and Reverse Transformation Module 235. In some exemplary embodiments, Certificate Update Module 260 may be configured to delete the certificate from Memory 210 and store the second certificate in Memory 210. In some exemplary embodiments, Certificate Update Module 260 may be invoked based on a command of a user of Computing Device 200, based on an application of an automated rule, based on a remote command from a remote server, such as a cloud-based server, or the like. The remote command may be invoked based on a rule, based on a command from a system administrator maintaining the sub-network, or the like.

Figure 3A:
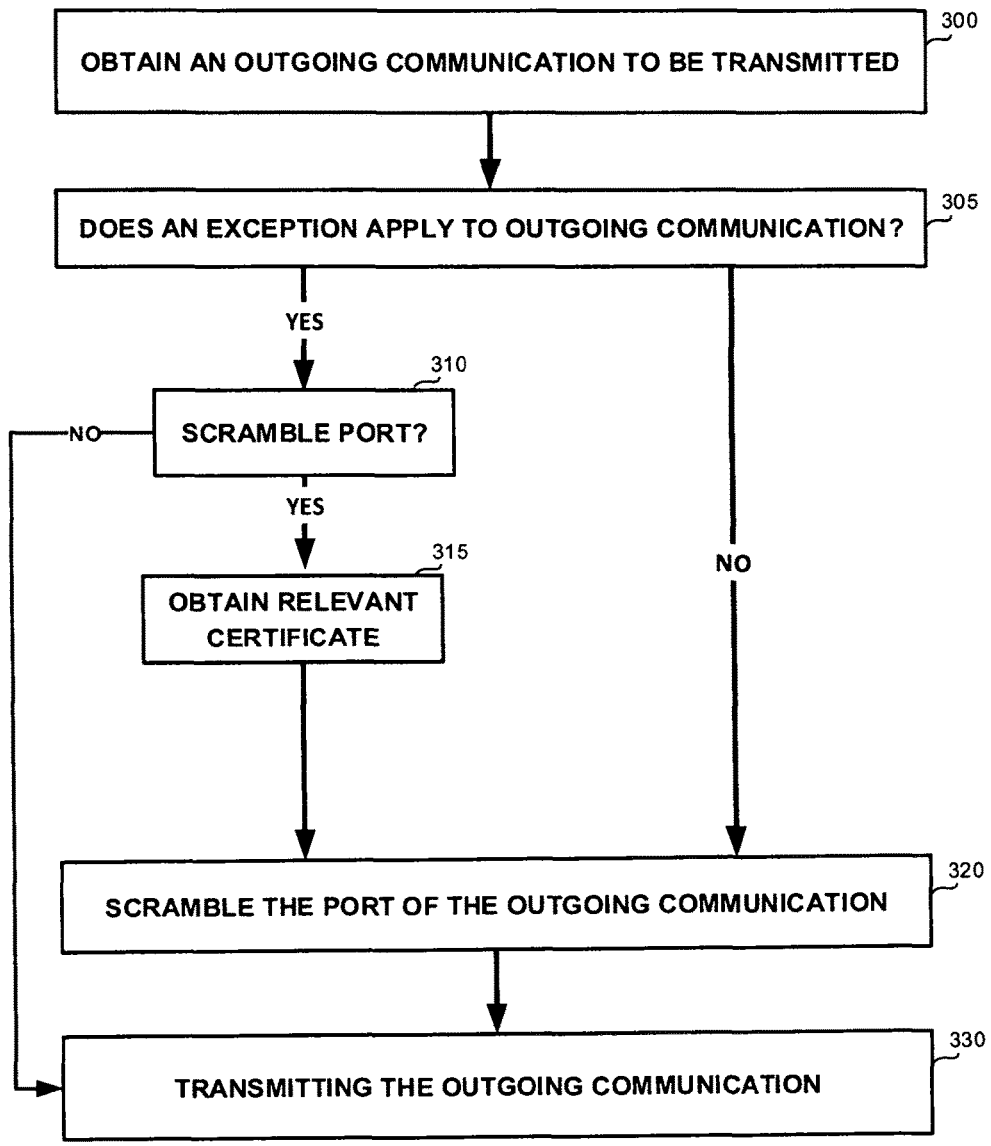
FIGS. 3A and 3B show flowchart diagrams of methods, in accordance with some exemplary embodiments of the disclosed subject matter.

Referring now to FIG. 3A showing a flowchart diagram of a method in accordance with some exemplary embodiments of the disclosed subject matter. The method of FIG. 3A may be performed by device, such as Computing Device 200 of FIG. 2.

On Step 300, an outgoing communication to be transmitted may be obtained. In some exemplary embodiments, the outgoing communication may be received from an application program requesting to transmit the outgoing communication.

The outgoing communication may be designated to be received at a destination via a first port. The destination may be a destination external to the computerized apparatus, e.g. another device. As an example, the destination of a UDP packet may be provided as an IP address and a port (e.g., 192.168.1.52:80).

On Step 305, a determination whether an exception applies to the outgoing communication may be made. In some exemplary embodiments, one or more potential exceptions may be hard coded. Additionally or alternatively, one or more potential exceptions, or parameters thereof, may be retained in memory of the device executing the method.

One example of an exception may be that the application program requesting to transmit the outgoing communication is an authorized program. In some exemplary embodiments, authorized programs of the computing device may be programs or applications authorized to transmit and receive communication without scrambling, in order to be able to effectively communicate with other devices on the same network that are not a part of sub-network. The determination may be accomplished by consulting a list of authorized programs, such as the blacklist described in the context of FIG. 2.

Another example of an exception may be that the outgoing communication is a server communication, such as for example, a communication directed to a DHCP server. Server communication may be transmitted and received without scrambling. The determination may be accomplished by identifying that the first port is a port of a server communication, based on adherence of a payload of the outgoing communication to a predetermined protocol, or the like.

Yet another example of an exception may be that the outgoing communication is directed to an authorized destination device. The authorized destination device may not be a part of the sub-network. In some exemplary embodiments, the computerized apparatus may communicate with the authorized destination device without scrambling communications there-between. Additionally or alternatively, the computerized apparatus may communicate with the authorized destination device by scrambling communication before transmitting, based on a second certificate. The determination may be accomplished by identifying a match between the destination IP address and an IP address of the authorized destination device retained by the computerized apparatus.

In case, an exception applies, Step 310 may be performed. Step 320 may be performed for all communications for which no exception applies.

On Step 310, a determination whether or not the port of the outgoing communication should be scrambled is made. In case the exception stipulates that no scrambling is performed, Step 330 may be performed, and the outgoing communication may be transmitted without scrambling its port. In case the exception stipulates that scrambling is to be performed but in a different manner, Step 315 may be performed.

On Step 315, a certificate may be obtained. The certificate may be different than the certificate shared by the sub-network. The certificate may be a certificate that is deemed relevant for the exception which applies. In some exemplary embodiments, the relevant certificate may be shared between the computerized apparatus and the authorized destination device, and used in communications therebetween. In some exemplary embodiments, the relevant certificate may be retained by the memory of the device along with the IP address of the authorized destination device for which it is relevant. Additionally or alternatively, the relevant certificate may be obtained from a user of the authorized destination device.

On Step 320, the port toward which the outgoing communication is directed at may be scrambled based on the certificate. In some exemplary embodiments, the port may be scrambled by applying a transformation function on an identifier of the port to obtain an identifier of an alternative port. The transformation function may depend on the certificate shared among the portion of devices, and may be utilized by each device of the portion of devices to perform the scrambling. The certificate used in Step 320 may be the shared certificate of the sub-network. Additionally or alternatively, in case of an exception which applies, the certificate used for the port scrambling may be the certificate obtained in Step 315. Step 320 may modify the outgoing communication and provide a modified outgoing communication that is direct at the scrambled port. The modified outgoing communication may be transmitted instead of the outgoing communication.

On Step 330, the outgoing communication may be transmitted to the destination device. The outgoing communication may either be a modified outgoing communication if Step 320 was performed, or the original outgoing communication if Step 320 was not performed.

In case Step 320 is performed, the outgoing communication may be directed to be received at the destination device via the scrambled port. In some exemplary embodiments, if the destination device is a member of the sub-network, the destination device may retain the certificate, and may be able to descrambling the port. Otherwise, the target device may not descramble the scrambled port, or may perform a different reverse transformation on the scrambled port; and may not be able to correctly process the outgoing communication.

Additionally or alternatively, if the destination device is an authorized destination device, a server, or another device for which an exception applies, the outgoing communication may be correctly processed by the destination device, albeit the destination device may not retain the shared certificate of the sub-network.

Figure 3B:
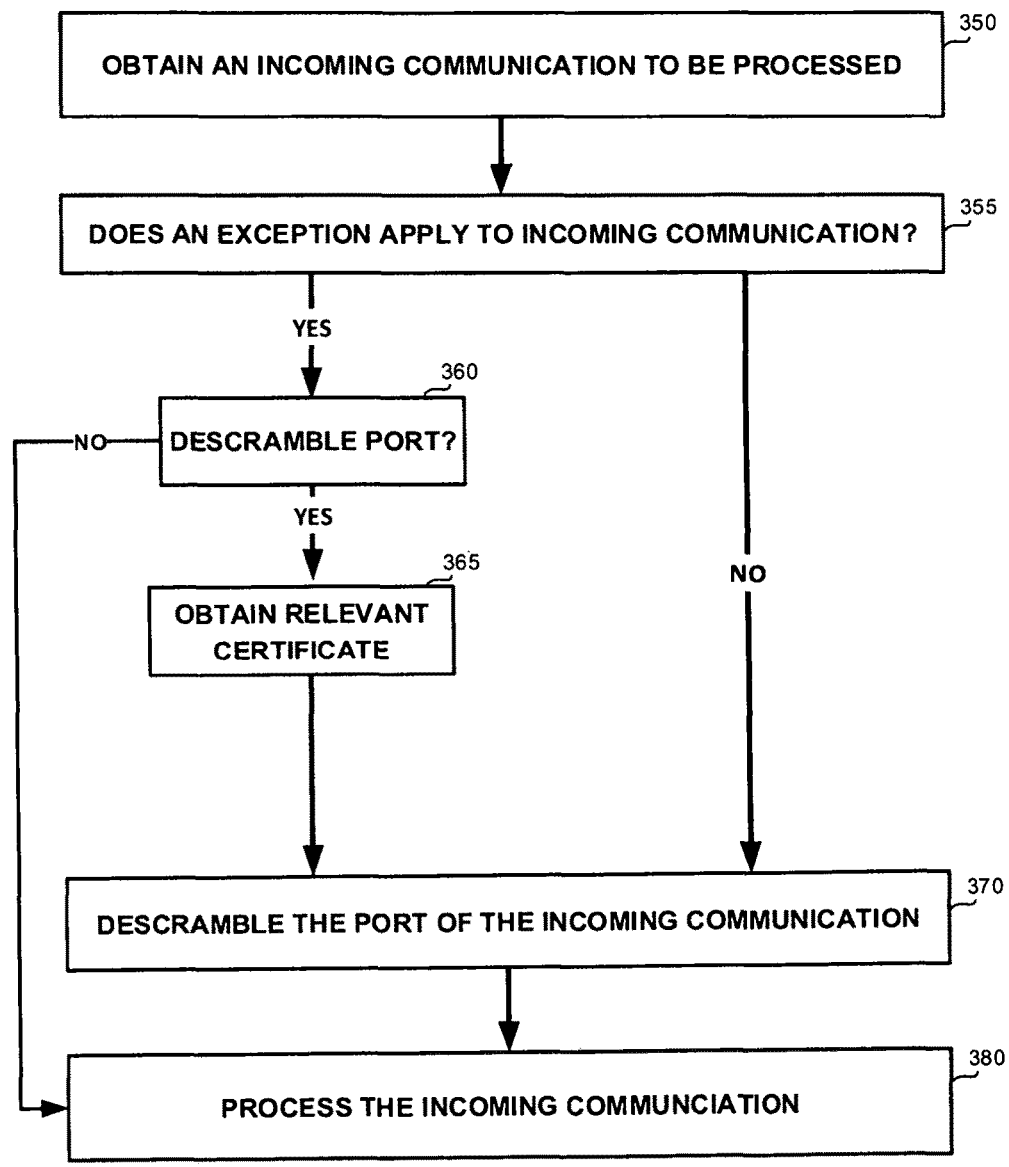

Referring now to FIG. 3B showing a flowchart diagram of a method in accordance with some exemplary embodiments of the disclosed subject matter. The method of FIG. 3B may be performed by device, such as Computing Device 200 of FIG. 2.

On Step 350, an incoming communication to be processed may be obtained. In some exemplary embodiments, the incoming communication may be received from a source device, such as Device 110 of FIG. 1A. The source device may operate within the computer network comprising the computerized apparatus receiving the incoming communication. Source device may or may not be a member of a sub-network. Members of the sub-network may communicate by selectively scrambling ports based on a shared certificate. The incoming communication may be designated to be received via a first port.

On Step 355, a determination whether an exception applies to the incoming communication may be made.

One example of an exception may be that the application program who had transmitted the incoming communication from the source device is an authorized program, such as an incoming mail server communication, an incoming web server communication, or the like. The determination may be accomplished by consulting a list of authorized programs, such as the blacklist described in the context of FIG. 2, or based on a payload of the incoming communication.

Another example of an exception may be that the incoming communication is a server communication, such as for example, a communication originating from a DHCP server, a webserver, an email server, or the like. Server communication may be transmitted and received without scrambling. The determination may be accomplished by identifying that the first port is a port of a server communication, based on adherence of a payload of the outgoing communication to a predetermined protocol, or the like.

Yet another example of an exception may be that the outgoing communication is transmitted from an authorized source device that is not a part of the sub-network. In some exemplary embodiments, the device may process communications from the authorized destination device without descrambling their ports. Additionally or alternatively, descrambling may be performed using a different certificate.

On Step 360, a determination may be made as to whether the exception which applies stipulates that the incoming communication is or is not to be scrambled. In case the port is not to be descrambled, Step 380 may be performed. Otherwise, Step 365 may be performed.

On Step 365, a certificate that is relevant for the exception may be obtained. In some exemplary embodiments, the relevant certificate may be shared between the device and the authorized source device, and may be retained by the memory of the device along with the IP address of the authorized source device. Additionally or alternatively, the relevant certificate may be obtained from a user of the authorized destination device.

On Step 370, the port via which the incoming communication has been received may be descrambled. In some exemplary embodiments, the port may be descrambled by applying a reverse transformation function on an identifier of the first port to obtain an identifier of an alternative port. In case no exception applies, the certificate used for the reverse transformation may be a default certificate which is shared among the sub-network. In case an exception does apply, the relevant certificate obtained on Step 365 may be utilized.

On Step 380, the incoming communication may be processed. In case the port was not descrambled, the incoming communication may be processed in its original port. In case the port was descrambled, the incoming communication may be processed as if received in the descrambled port.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device having a processor and a memory, wherein said device operating within a computer network comprising a plurality of devices, wherein said memory retaining a certificate, wherein the certificate is shared among a portion of the plurality of devices, wherein said device comprising:
    a communication module for sending and receiving transmissions to and from devices in the computer network;
    a scrambling module configured to apply a transformation function on an identifier of a first port to obtain an identifier of a second port, wherein the transformation function depends on the certificate;
    a descrambling module configured to apply a reverse transformation function on the identifier of a fourth port to obtain an identifier of a third port, wherein the reverse transformation function depends on the certificate and is a reverse function of the transformation function;
    an outgoing agent configured to obtain outgoing communications, wherein said outgoing agent is configured to invoke said scrambling module on an identifier constituting the identifier of said first target port, in an outgoing communication, to obtain an identifier of said second target port, wherein said outgoing agent is further configured to provide a modified outgoing communication to said communication module for being transmitted to a target device via the second target port, whereby if the target device is a member of the portion of the plurality of devices, the target device is enabled to perform reverse transformation on the identifier of the second target port to obtain the identifier of the first target port of the outgoing communication;

whereby if the target device is not a member of the portion of the plurality of devices, it becomes misled to relate to the modified outgoing communication as a communication being targeted to a port other than the first source port; and an incoming agent configured to obtain incoming communications received by said communication module, wherein said incoming agent is configured to invoke said descrambling module on an identifier of a second source port of an incoming communication, wherein the incoming communication was transmitted by a source device, whereby an identifier of a first source port is obtained, wherein said incoming agent is further configured to output a modified incoming communication, wherein the modified incoming communication is directed at the first source port instead of the second source port, whereby if the source device is not a member of the portion of the plurality of devices, said device becomes misled to relate to the incoming communication as a communication being transmitted by the source device to a port other than the first target port.

2. The device of claim 1,
wherein said outgoing agent is configured to monitor outgoing server communications, wherein said outgoing agent is configured to provide a server outgoing communication to said communication module to transmit the server outgoing communication, without invoking said scrambling module; and
wherein said incoming agent is configured to process incoming server communication of said device, wherein said incoming agent is configured to provide a server incoming communication for processing by said device, without invoking said descrambling module.

3. The device of claim 2, wherein said outgoing agent is configured to identify the server outgoing communication based on a port identifier of the server outgoing communication.

4. The device of claim 3, wherein said outgoing agent is configured to identify the server outgoing communication further based on adherence of a payload of the server outgoing communication to a predetermined protocol.

5. The device of claim 2, wherein the server outgoing communication is a communication directed at a Dynamic Host Configuration Protocol (DHCP) server, whereby the DHCP server is capable of managing the Internet Protocol (IP) addresses in the computer network, wherein the DHCP server is capable of assigning a first IP address to said device and a second IP address to a second device which does not retain the certificate.

6. The device of claim 1, wherein the wherein the plurality of devices comprises at least one device not retaining the certificate.

7. The device of claim 1, wherein said memory retaining an IP address of a second device, wherein the second device operating within the computer network, wherein the portion of the plurality of devices excludes the second device;
wherein said outgoing agent is further configured to determine that a second outgoing communication is directed to the second device, based on the second outgoing communication being addressed to the IP address of the second device, wherein said outgoing agent is configured to provide the second outgoing communication to said communication module for transmission, without invoking said scrambling module; and wherein said incoming agent is further configured to determine that a second incoming communication originates from the second device based on the IP address, wherein said incoming agent is configured to process the second incoming communication without invoking said descrambling module.

8. The device of claim 1, wherein the certificate is selected from the group consisting of: a static encryption key; a time-dependent encryption key; a combination of static and time-dependent keys.

9. The device of claim 1, further comprising:
a certificate updating module configured to replace the certificate with a second certificate, wherein the second certificate is shared among a second portion of the plurality of devices, whereby the transformation function and the reverse transformation function are modified to utilize the second certificate, whereby said device is enabled to communicate with devices comprised by the second portion of the plurality of devices.

10. The device of claim 1, wherein the certificate is distributed to the portion of the plurality of devices by a server, wherein the server is connected to the computer network.

11. The device of claim 1, wherein the certificate is generated based on credentials provided by a user of said device, whereby the certificate is not distributed over the computer network.

12. The device of claim 1, wherein said memory retaining a blacklist of programs, wherein said outgoing agent is configured to invoke the scrambling module on outgoing communications of programs, depending on whether or not an outgoing communication is initiated by a program comprised in the blacklist.

13. The device of claim 12, wherein the blacklist comprises at least one of: a web browser program and an e-mail client.

14. The device of claim 1, wherein said memory retaining a second certificate and an IP address of a second device, wherein the second device is excluded from the portion of devices, wherein the second device does not retain the certificate, wherein the second device does retain the second certificate;
wherein said outgoing agent is further configured to determine that a second outgoing communication is directed to the second device, based on the second outgoing communication being addressed to the IP address of the second device, wherein said outgoing agent is configured to invoke said scrambling module to apply a second transformation function on an identifier of an outgoing port of the second outgoing communication, wherein the second transformation function depends on the second certificate, whereby modifying the outgoing port of the second outgoing communication; and
wherein said incoming agent is further configured to determine that a second incoming communication originates from the second device based on the IP address, wherein said incoming agent is configured to invoke said descrambling module to apply a reverse second transformation function on an identifier of an incoming port of the second incoming communication, wherein the second reverse transformation function is a reverse function of the second transformation function and depends on the second certificate, whereby modifying the incoming port of the second incoming communication;

whereby said device is enabled to communicate with the second device while scrambling communication ports using the second certificate.

15. A computer-implemented method performed by a device operating within a computer network, wherein the computer network comprising a plurality of devices, wherein a certificate is shared among a portion of the plurality of devices, wherein said computer-implemented method comprising:
in response to the device intending to transmit an outgoing communication to a target device in the computer network, via a first port:
scrambling the first port of the outgoing communication to obtain a second port, wherein said scrambling comprises applying a transformation function on an identifier of the first target port to obtain an identifier of the second target port, wherein the transformation function utilizes the certificate; and
transmitting the outgoing communication to the target device via the second target port, whereby if the target device is a member of the portion of the plurality of devices, the target device is enabled to perform a reverse transformation on the identifier of the second target port to obtain the identifier of the first target port of the outgoing communication; whereby if the target device is not a member of the portion of the plurality of devices, it becomes misled to relate to the modified outgoing communication as a communication being targeted to a port other than the first target port:
and
in response to the device receiving, via a second source port, an incoming communication from a source device in the computer network:
descrambling the second source port of the incoming communication to obtain a first source port, wherein said descrambling comprises applying a reverse transformation function on an identifier of the second source port of the incoming communication to obtain an identifier of the first source port, wherein the reverse transformation function utilizes the certificate and is a reverse function of the transformation function; and
directing the incoming communication at the first source port instead of the second source port, whereby if the source device is not a member of the portion of the plurality of devices, the device becomes misled to relate to the incoming communication as a communication being transmitted by the source device to a port other than the first source port.

16. The computer-implemented method of claim 15 further comprises:
in response to the device intending to transmit an outgoing server communications via a target port, transmitting the server outgoing communication via the target port, without performing said scrambling on the target port; and
in response to the device receiving an incoming server communication via a source port, processing the incoming server communication such as received via the source port, without performing said descrambling on the source port.

17. The computer-implemented method of claim 15, wherein the portion of the plurality of devices excludes a second device, the computer-implemented method further comprises:
in response to the device intending to transmit a second outgoing communication via a target port, determining whether the second outgoing communication is directed to the second device based on the second outgoing communication being addressed to an IP address of the second device;
in response to determining that the second outgoing communication is directed at the second device, transmitting the second outgoing communication to the second device via the target port without performing said scrambling on an identifier of the target port;
in response to receiving a second incoming communication via a source port, determining whether the second incoming communication originates from the second device based on the IP address; and
in response to determining that the second incoming communication originates from the second device, processing the second incoming communication without performing said descrambling on an identifier of the source port.

18. The computer-implemented method of claim 15, wherein the device retaining in a memory a blacklist of programs, wherein said computer-implemented method further comprises:
transmitting the second outgoing communication without or with performing said descrambling on a port identifier of the second outgoing communication, depending on whether or not an outgoing communication is initiated by a program comprised in the blacklist.

19. The computer-implemented method of claim 15 further comprises:
obtaining credentials from a user of the device; and
generating, by the device and based on the credentials, the certificate, whereby the certificate is locally generated and not distributed over the computer network.

20. The computer-implemented method of claim 15 further comprises:
replacing the certificate with a second certificate, wherein the second certificate is shared among a second portion of the plurality of devices, whereby the transformation function and the reverse transformation function are modified to utilize the second certificate, whereby the device is enabled to communicate with devices comprised by the second portion of the plurality of devices.

* * * * *